United States Patent
Schlenga et al.

(10) Patent No.: US 9,197,060 B2
(45) Date of Patent: Nov. 24, 2015

(54) INDUCTIVE FAULT CURRENT LIMITER WITH DIVIDED PRIMARY COIL CONFIGURATION

(71) Applicant: Bruker HTS GmbH, Hanau (DE)

(72) Inventors: Klaus Schlenga, Linkenheim-Hochstetten (DE); Alexander Usoskin, Hanau (DE)

(73) Assignee: Bruker HTS GmbH, Hanau ( * ) Notice: Subject to any disclaimer, the term of this patent is extended or adjusted under 35 U.S.C. 154(b) by 147 days.

(21) Appl. No.: 14/037,432

(22) Filed: Sep. 26, 2013

(65) Prior Publication Data

US 2014/0098451 A1    Apr. 10, 2014

(30) Foreign Application Priority Data

Oct. 5, 2012 (DE) .......................... 10 2012 218 261

(51) Int. Cl.
  *H02H 9/02* (2006.01)
  *H01F 6/06* (2006.01)
  *H01F 36/00* (2006.01)
  *H01F 6/00* (2006.01)

(52) U.S. Cl.
  CPC . *H02H 9/02* (2013.01); *H01F 6/06* (2013.01); *H01F 36/00* (2013.01); *H01F 2006/001* (2013.01); *Y02E 40/66* (2013.01)

(58) Field of Classification Search
  CPC ..... H01F 6/06; H01F 36/00; H01F 2006/001; Y02E 40/66
  USPC ........................................................ 361/93.6
  See application file for complete search history.

(56) References Cited

U.S. PATENT DOCUMENTS

| | | | |
|---|---|---|---|
| 4,045,823 A * | 8/1977 | Parton | ............................ 361/58 |
| 5,140,290 A | 8/1992 | Dersch | |
| 5,379,020 A | 1/1995 | Meier | |
| 5,694,279 A | 12/1997 | Mumford | |
| 6,016,094 A | 1/2000 | Gerhold | |
| 6,795,282 B2 | 9/2004 | Neumuller | |
| 7,586,717 B2 | 9/2009 | Usoskin | |
| 2003/0107862 A1* | 6/2003 | Cha | .............................. 361/93.1 |
| 2006/0040829 A1* | 2/2006 | Rupich et al. | ................. 505/100 |
| 2007/0127171 A1 | 6/2007 | Lee | |
| 2012/0306606 A1 | 12/2012 | Noe | |

FOREIGN PATENT DOCUMENTS

| | | | |
|---|---|---|---|
| EP | 2 402 961 | | 1/2012 |
| FR | 2691591 | * | 5/1992 |
| FR | 2 691 591 | | 11/1993 |
| WO | WO 97/02638 | | 1/1997 |

* cited by examiner

*Primary Examiner* — Thienvu Tran
*Assistant Examiner* — Tien Mai
(74) *Attorney, Agent, or Firm* — Paul Vincent

(57) ABSTRACT

An inductive fault current limiter (1) has a normally conducting primary coil assembly (2) with a multiplicity of turns (3) and a superconducting, short-circuited secondary coil assembly (4), wherein the primary coil assembly (2) and the secondary coil assembly (4) are at least substantially coaxial with respect to each other and at least partially interleaved in each other. The primary coil assembly (2) has a first coil section (2a) and a second coil section (2b), wherein the turns (3) of the first coil section (2a) of the primary coil assembly (2) are disposed radially inside the secondary coil assembly (4) and the turns (3) of the second coil section (2b) of the primary coil assembly (2) are disposed radially outside the secondary coil assembly (4). The fault current limiter has an increased inductance ratio.

14 Claims, 5 Drawing Sheets

INDUCTIVE FAULT CURRENT LIMITER WITH DIVIDED PRIMARY COIL CONFIGURATION

BACKGROUND OF THE INVENTION

The invention relates to an inductive fault current limiter, comprising
- a normally conducting primary coil assembly with a multiplicity of turns, and
- a superconducting, short-circuited secondary coil assembly, wherein the primary coil assembly and the secondary coil assembly are disposed at least substantially coaxially with respect to each other and at least partially interleaved in each other.

Such an inductive fault current limiter is known from EP 2 402 961 A1.

Fault current limiters are used to limit the current drawn from a source in case of short circuits. With superconducting fault current limiters, comparatively high currents, for example, in public electrical supply networks, can be made safe.

Superconducting fault current limiters of the direct current type comprise, for example, a superconducting conductor section, through which the current to be limited flows. If the current rises due to a short circuit, the critical current in the superconducting conductor section is exceeded so that it becomes normally conducting ("quench"), which increases the resistance greatly. This causes the current flowing through the conductor section to fall correspondingly. This type of fault current limiter is termed the resistive type.

Superconducting fault current limiters for alternating current applications can be implemented both as resistive and as inductive fault current limiters. Inductive fault current limiters are essentially constituted by inductively coupled turns. The alternating current to be limited flows through a normally conducting primary coil assembly ("primary side") and, in a superconducting secondary coil assembly ("secondary side"), a current is induced that counteracts the magnetic flux produced by the current in the primary coil assembly. This largely cancels out the inductance of the primary coil assembly. If the alternating current to be limited in the primary coil assembly rises due to a short circuit, the induced current in the secondary coil assembly also rises until the critical current is exceeded in the secondary coil assembly and the secondary coil assembly becomes normally conducting ("quench"). In the normally conducting condition of the secondary coil assembly, its current only compensates for a small part of the magnetic flux of the primary coil assembly, which, in turn, raises the inductance of the primary coil assembly. This increase in inductive resistance limits the current through the primary coil assembly.

An inductive fault current limiter is known from EP 2 402 961 A1, in which a secondary coil, which comprises a plurality of turns radially disposed within the primary coil, and which is constituted as a superconducting, short-circuited ring, is disclosed. From DE 10 2010 007 087 A1, an inductive fault current limiter is known, in which a cryostat with a secondary coil is disposed inside a primary coil. From DE 196 28 358 C1 (and from U.S. Pat. No. 5,140,290 A, U.S. Pat. No. 6,795,282 B2, U.S. Pat. No. 7,586,717 B2, U.S. Pat. No. 5,694,279 A, DE 195 24 579 A1, U.S. Pat. No. 5,379,020 A), it is known that a primary coil and a secondary coil may be disposed side by side and coupled via a ring-shaped iron core.

The efficiency of an inductive fault current limiter is measured according to the inductance ratio of the primary coil assembly in a superconducting secondary coil assembly ("normal operation") and in a normally conducting secondary coil assembly ("fault operation"). During fault operation, the current in the primary coil assembly should be very much reduced as compared with normal operation, in accordance with a high inductance ratio.

The object of the invention is to provide a fault current limiter with an increased inductance ratio.

SUMMARY OF THE INVENTION

This object is achieved by an inductive fault current limiter of the type stated above, which is characterized
in that the primary coil assembly comprises a first coil section and a second coil section,
wherein the turns of the first coil section of the primary coil assembly are disposed radially inside the secondary coil assembly,
and wherein the turns of the second coil section of the primary coil assembly are disposed radially outside the secondary coil assembly.

According to the invention, the primary coil section is radially divided into (at least) two coil sections, and the secondary coil assembly is disposed radially between these two coil sections of the primary coil assembly.

To ensure high efficiency of an inductive fault current limiter, the magnetic flux of the primary coil assembly must, in normal operation, be as completely as possible canceled out by the magnetic flux induced in the secondary coil assembly. To achieve this, the secondary coil assembly should be as close as possible to the primary coil assembly, which is not easy to achieve because of design constraints, such as the wall thicknesses and distances of a cryostat vessel for the superconducting secondary coil assembly and the finite radial extent of the coil assemblies. In the case of inductive fault current limiters for higher currents (for example, in public electricity supply networks), the primary coil assembly and the secondary coil assembly are of considerable thickness so that a substantial proportion of the turns of the primary coil assembly are often at a considerable distance from the secondary coil assembly, making complete compensation of the fluxes mentioned above practically impossible.

By dividing the primary coil assembly into multiple coil sections and inserting the secondary coil assembly, this distance can be effectively reduced despite the larger total radial extent. This improves the compensation of the magnetic flux of the primary coil assembly by the secondary coil assembly in normal operation and a higher inductance ratio is achieved.

The coil sections of the primary coil assembly are electrically connected in such a way that the B-fields of the coil sections in the inner region of the radially interior coil sections add up, wherein the coil sections are usually connected in series. The turns are typically made of copper. The secondary coil assembly comprises at least one superconducting short-circuited conductor loop. In the secondary coil assembly, in particular, strip-shaped superconductors ("coated conductors") can be used, but superconducting wires with superconducting filaments made of $Nb_3Sn$, $NbTi$, $MgB_2$ can also be used. The secondary coil assembly is typically protected from burning through in the event of quenching by a normally conducting shunt configuration (typically ring-shaped); with suitable conductor properties (in particular, suitable conductor geometry), however, it is possible to dispense with the shunt configuration (if desired, for example, often in a single-turn coil made of strip conductors, for which $3 \leq U/B \leq 10$ applies, where U: circumference of the coil and B: conductor width). The secondary coil assembly is typically disposed in a cryostat, which is cooled, for example, with liquid helium or liquid nitrogen, for cooling.

In an advantageous embodiment of the inventive fault current limiter, the secondary coil assembly is disposed centrally between an innermost turn layer of the first coil section of the primary coil assembly and an outermost turn layer of the second coil section of the primary coil assembly. In this way, very good compensation of the magnetic flux of the primary coil assembly can be achieved. If the turn density and/or the number of turns in the various coil sections of the primary coil assembly differs considerably, the secondary coil assembly can alternatively be positioned such that the average radial distance between the turns of the primary coil assembly and the secondary coil assembly is minimized. If the secondary coil assembly has multiple, radially differently positioned rings or turns, the radial position of the secondary coil assembly is generally determined as the center between their radially innermost and radially outermost rings or turns.

An embodiment is preferred, in which the turns of the primary coil assembly are distributed at least substantially evenly among the first coil section and the second coil section of the primary coil assembly. With such a distribution, the radial distance of the most distant turns of the two coil sections of the primary coil assembly from the secondary coil assembly can usually be kept small. The distribution is substantially even, in particular, if the numbers of turns of the first and second coil section differ by 20% or less, preferably by 10% or less, relative to the smaller number of turns.

In an advantageous embodiment, the secondary coil assembly comprises one or more superconducting, ring-shaped closed single-turn coils. Single-turn coils are easy to manufacture, in particular, with strip-shaped superconductors; the ring-shaped single-turn coils can also be constituted without joints (by superconducting coating of a ring-shaped closed substrate with superconducting material). Multiple superconducting single-turn coils can be inserted radially into each other or also axially one above the other to constitute the secondary coil assembly.

An embodiment is especially preferred, in which the secondary assembly comprises a first coil section and a second coil section, wherein the first coil section of the secondary coil assembly is disposed radially inside the second coil section of the secondary coil assembly, and in which a normally conducting shunt assembly is disposed radially between the first coil section and the second coil section of the secondary coil assembly. With the shunt configuration, burning through (in particular, melting) of the superconductor in the event of quenching can be prevented; the shunt configuration provides a low-resistance parallel current path with respect to the quenched secondary coil assembly so that the current from the secondary coil assembly can be conducted out into the shunt configuration. However, eddy currents can also be induced in a shunt configuration in normal operation. This increases the necessary cooling power and noticeable stray inductance of the primary coil assembly can occur, causing the inductance ratio to decrease. By positioning the shunt configuration radially between two coil sections of the superconducting secondary coil assembly, the shunt configuration can be effectively shielded from the two radially inner and outer adjacent coil sections of the primary coil assembly so that eddy currents in the shunt configuration are minimized. Typically, both the first coil assembly and the second coil section of the secondary coil assembly each provide at least one superconductively short-circuited current path.

A variant of this embodiment is preferred, in which the shunt configuration has one or more closed shunt rings, which are disposed radially between the first coil section and the second coil section of the secondary coil configuration. In this case, the current from the secondary coil assembly can be brought in over the entire circumference by means of the shunt ring or rings in the event of quenching. The shunt ring or rings are usually made of strip-shaped stainless steel.

The shunt configuration advantageously has two shunt rings disposed interleaved in each other, wherein the radially inner shunt ring is electrically conductively connected to the first coil section of the secondary coil assembly, and the radially outer shunt ring is electrically conductively connected to the second coil section of the secondary coil assembly. In this way, the coil sections of the secondary coil assembly can be separately protected. In particular, it is possible to thermally decouple the shunt rings of the first and second coil sections to a certain extent so that the amount of time needed to complete quenching of the entire secondary coil assembly can be extended. Note that, for each coil section of the secondary coil assembly, multiple shunt rings can also be used that are typically disposed axially one above the other, to protect individual levels of the secondary coil assembly separately.

In an advantageous variant, the shunt configuration has a multiplicity of metallic jumpers, which electrically conductively connect the shunt configuration to the first and/or second coil section(s) of the secondary coil assembly. By contacting using individual jumpers, the extent of individually protected regions can be specifically set. Six or more, in the case of larger fault current limiters (for example, for public electricity supply networks), also twelve or more jumpers, are usually provided over the circumference of a coil section of the secondary coil assembly. In single-turn coils made of strip-shaped superconductors, the distance ABS of the jumpers in the circumferential direction is preferably chosen such that the following applies with respect to the ratio to the conductor width B: $3 \leq ABS/B \leq 10$. This prevents the superconductor from burning through in the event of quenching.

An embodiment is also preferred, in which the first and the second coil section of the secondary coil assembly have a different number of superconducting, ring-shaped closed single-turn coils. In this way, the current distribution in the single-turn coils can be optimized, in particular to maximize the current-carrying capacity of the fault current limiter in normal operation. Typically, the number differs by 10% or more, preferably by 20% or more, relative to the smaller number. Alternatively, the first and second coil section have an identical number of superconducting, ring-shaped closed single-turn coils.

An embodiment is especially preferred, in which the primary coil assembly and the secondary coil assembly are constructed at least substantially rotationally symmetrically with respect to an axis, in particular, with respect to a vertical axis. In this way, magnetic field peaks are avoided, which enables a high current-carrying capacity of the fault current limiter. A vertical orientation simplifies the structure, in particular, due to reduced bearing forces.

In a preferred embodiment, a ferromagnetic core is disposed radially inside the first coil section of the primary coil assembly. With the ferromagnetic core, the magnetic flux is bundled, improving compensation of the magnetic flux of the primary coil assembly in normal operation and increasing the inductance ratio (and also the impedance ratio) between fault operation and normal operation. The ferromagnetic core can be constituted with different shapes, for example, as a tube or cylinder. The interior space of the first coil section of the primary coil assembly can be filled entirely or (preferably) only partially by the core. For any shape of ferromagnetic core, the excitation of shielding currents in the core can be suppressed by laminated structures, slots, or similar suitable measures.

An embodiment is also advantageous, in which the secondary coil assembly extends at least the same distance in the axial direction as the primary coil assembly. This also improves compensation of the magnetic flux of the primary coil assembly in normal operation. Usually, substantially the same axial length of primary coil assembly and secondary coil assembly is chosen. If the coil sections of a coil assembly extend differently in the axial direction, the length of the coil assembly is determined from the two ends of the coil sections that project farthest in the axial direction on each side.

In an advantageous embodiment, the coil sections of the primary coil assembly extend different distances in the axial direction. In this way, the magnetic field distribution in the fault current limiter can be optimized, in particular, for maximum current-carrying capacity in normal operation.

An embodiment is also preferred, in which the secondary coil assembly is made of a high-temperature superconducting material, in particular, YBCO or BSCCO. This increases the current-carrying capacity of the fault current limiter. For the purpose of the invention, high-temperature superconductor materials are all superconducting materials with a critical temperature of 40 K or higher.

In an especially advantageous embodiment, the secondary coil assembly is disposed in a cryostat and the secondary coil assembly, the first and second coil section of the primary coil assembly, and the cryostat are positioned and dimensioned such that, for the interstices ZR in the radial direction between mutually opposite sides of the secondary coil assembly, on one hand, and the first and second coil sections of the primary coil, on the other, the following applies: $ZR < \frac{1}{2}D_{PS} + \frac{1}{2}D_S$, preferably $ZR < \frac{1}{2}D_{PS}$, where $D_{PS}$: thickness of the coil section of the primary coil assembly in the radial direction which limits the relevant interstice ZR and $D_S$: thickness of the secondary coil assembly in the radial direction which limits the relevant interstice ZR. This ensures that the distance saving due to the division of the primary coil assembly is not already substantially canceled out by the interstices stated above (which depend on the wall thickness of the cryostat and other factors). In the case of interstices that are variable (for example, in the axial direction), the relation refers to the averaged interstices; alternatively, it can be applied to the smallest interstices. Interstices are especially preferred that are each less than or equal to a quarter, highly preferably to an eighth, of the thickness $D_{PS}$ of the coil section of the primary coil assembly in the radial direction the which limits the relevant interstice. The following preferably also applies: $ZR \leq \frac{1}{4}D_{PS} + \frac{1}{2}D_S$ or also $ZR \leq \frac{1}{4}D_{PS} + \frac{1}{4}D_S$. Note that for each secondary coil assembly, there are two interstices that meet the conditions of this embodiment. Also note that different interstices ZR may be of different sizes and the thicknesses $D_{PS}$ of different coil sections of the primary coil assembly may be different.

An embodiment is also advantageous, in which the primary coil assembly has N coil sections, where N∈IN and N≥3, and that the fault current limiter has N−1 secondary coil assemblies, wherein a secondary coil assembly is disposed in each case radially between two coil sections of the primary coil assembly, in particular, wherein N=3 or N=4. In this embodiment, the primary coil assembly is divided even more finely, enabling the secondary coil assemblies to be still closer to the turns of the coil sections of the primary coil assembly; this enables an even better inductance ratio.

Further advantages result from the description and the drawing. Moreover, the features stated above and further below can be used singly or together in any combination. The embodiments shown and described are not intended to be an exhaustive list, rather examples to explain the invention.

BRIEF DESCRIPTION OF THE DRAWING

The invention is shown in the drawing and is explained in more detail using the example of the embodiments. The figures show.

DESCRIPTION OF THE PREFERRED EMBODIMENT

Figure 1:
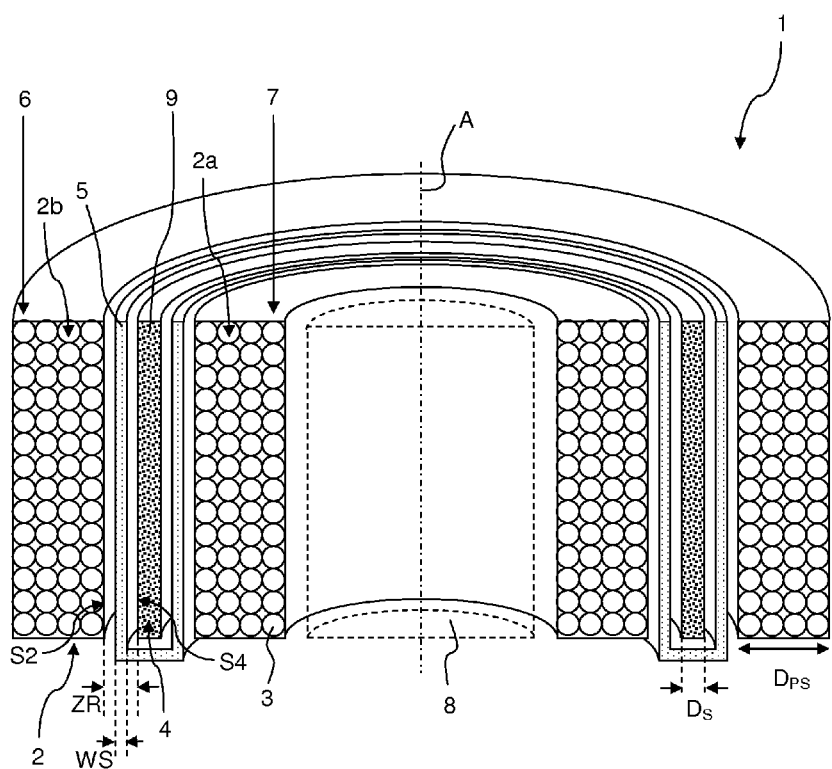
FIG. 1 a schematic, combined sectional and oblique view of a first embodiment of an inventive inductive fault current limiter.

FIG. 1 shows a schematic view of a section through an embodiment of an inventive fault current limiter 1.

The fault current limiter 1 is constructed essentially rotationally symmetrically with respect to a vertical axis A. It comprises a normally conducting primary coil assembly 2 with a first coil section 2a disposed radially inside and a second coil section 2b disposed radially outside. The two coil sections 2a, 2b each comprise a multiplicity of turns 3, wherein, in the embodiment shown, each coil section 2a, 2b comprises four layers of turns 3; the total turns 3 are evenly distributed among the two coil sections 2a, 2b. The two coil sections 2a, 2b are electrically connected in series to limit an alternating current flowing through them. A superconducting secondary coil assembly 4 is disposed radially between the two coil sections 2a, 2b. The primary coil assembly 2 and the secondary coil assembly 4 are coaxially aligned with respect to the axis A and are of equal length in the axial direction; however, it is enough if this orientation or these dimensions are substantially complied with (for example, by mutual tilting of up to 5°, or an axial protrusion of the secondary or primary coil assembly of up to 20% in total).

The secondary coil assembly 4 is disposed in a cryostat 5, whose interior space is cooled in a manner not depicted (for example, with liquid nitrogen at 77 K), so that the secondary coil assembly 4 is at a temperature that is below the critical temperature of the superconducting material used. The secondary coil assembly 4 comprises in the simplest case only one superconducting short-circuited single-turn coil 9; alternatively, the secondary coil assembly 2 can be constituted by multiple turns (if applicable, distributed among multiple layers of turns), for example, wound in a solenoid shape. The turns of the secondary coil assembly 4 are then superconductively short-circuited individually and/or in groups or together.

If desired, an iron core 8 (indicated by dashed lines) can be provided in the interior of the first coil section 2a.

The secondary coil assembly 4 is disposed centrally between the radially outermost turn layer 6 and the radially innermost turn layer 7.

An interstice ZR measured in the radial direction between the mutually facing, opposite sides S2 of the second coil section 2b of the primary coil assembly 2 and S4 of the secondary coil assembly 4 corresponds in this case to approximately ⅗ of the sum of the halved thickness $D_{PS}$ of the second coil section 2b and the halved thickness $D_S$ of the secondary coil assembly 4; the interstice ZR also corresponds to approximately ¾ of the halved thickness $D_{PS}$. The interstice ZR is essentially determined by the (total) wall thickness WS of the cryostat 5 and the distances of the second coil section 2b and the secondary coil assembly 4 from the cryostat 5.

The same applies to an interstice between the first coil section 2a and the secondary coil assembly 4 (not shown in any further detail). Note that in the schematic view, the radial distances between the outer wall of the cryostat 5 and the coil sections 2a, 2b and also the radial distances between the secondary coil assembly 4 and the inner wall of the cryostat 5 are shown enlarged.

Due to the inventive radial division of the primary coil assembly 2 and the positioning of the secondary coil assembly 4 radially between the coil sections 2a, 2b of the primary coil assembly 2, the radial distance between the secondary coil assembly 4 and the most distant turn layer of the primary coil assembly 2 can be clearly reduced as compared with positioning the secondary coil assembly radially inside or radially outside the primary coil assembly.

Figure 2A:
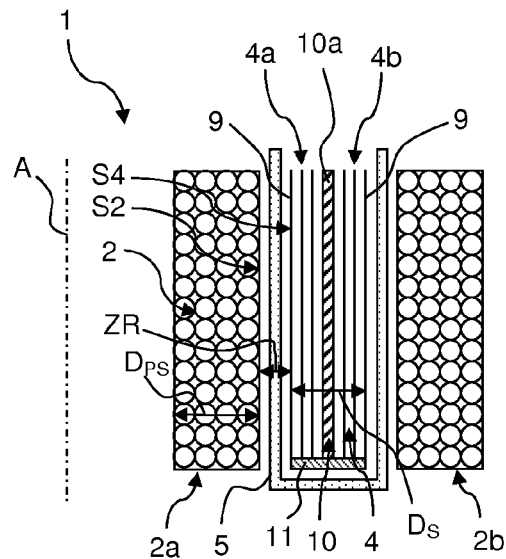
FIG. 2a a schematic sectional view of a second embodiment of an inventive fault current limiter, with a secondary coil assembly comprising a radially inner and a radially outer coil section, between which a shunt configuration is disposed.

FIG. 2a schematically illustrates a second embodiment of an inventive fault current limiter 1. For simplification, only one half of the sectional view is shown. (This also applies to FIGS. 3, 4, 5a, 5b, 6). Above all, the differences from the previous embodiment are explained.

Figure 2B:
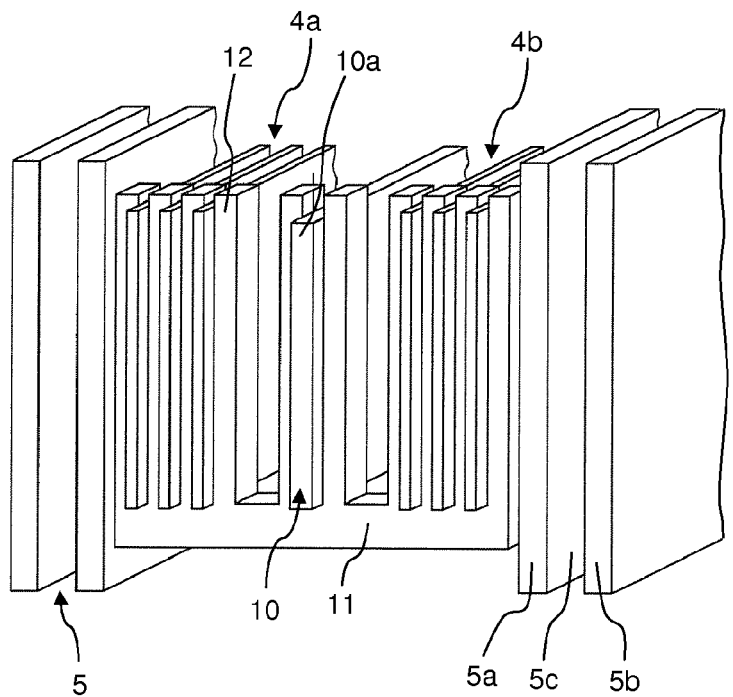
FIG. 2b a cutaway view of the embodiment of FIG. 2a, in a schematic oblique view.

In this embodiment, the secondary coil assembly 4, which is disposed in a cryostat 5, has a first, radially inner coil section 4a and a second, radially outer coil section 4b. Each coil section 4a, 4b comprises three single-turn coils 9 interleaved in each other. Between the coil sections 4a, 4b, a normally conducting shunt configuration 10 is placed, which, in this case, comprises a single, closed shunt ring 10a. The single-turn coils 9 of both coil sections 4a, 4b are connected to each other electrically and thermally via jumpers 11 distributed in the circumferential direction; the region of such a jumper 11 is especially clearly shown in FIG. 2b in a schematic oblique view. The jumper 11 forms rake-like clamping holders 12 for the single-turn coils 9 and the shunt ring 10a.

The cryostat 5 is constituted here with a double wall 5a, 5b and an evacuated cryo-insulation region 5c inside it. The shunt ring 10a is magnetically shielded in normal operation both radially inwardly and radially outwardly from the primary coil assembly 2 by the superconducting single-turn coils 9 of the two coil sections 4a, 4b of the secondary coil assembly 4.

In the embodiment shown in FIG. 2a, the radial interstice ZR between opposite, mutually facing sides S2, S4 corresponds to approximately 4/10 of the sum of half of the thickness $D_{PS}$ of the first coil section 2a of the primary coil assembly 2 and half of the thickness $D_S$ of the secondary coil assembly 4. In this case, the interstice ZR also corresponds to approx. ¾ of half of the thickness $D_{PS}$. The same applies here to the interstice between the second coil section 2b of the primary coil assembly 2 and the secondary coil assembly 4 (not depicted in further detail).

Figure 3:
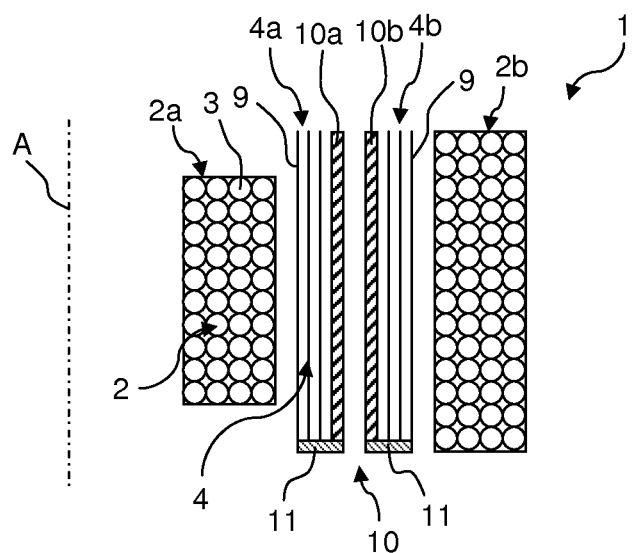
FIG. 3 a schematic sectional view of a third embodiment of an inventive fault current limiter, with a secondary coil assembly comprising a radially inner and a radially outer coil section, between which a shunt configuration, radially divided into two, is disposed.

FIG. 3 shows a third embodiment of an inventive fault current limiter 1. For simplification, the cryostat for the secondary coil assembly 4 has been omitted in the view (also applies to FIGS. 4, 5a, 5b, and 6). Only the essential differences from the embodiment in FIG. 2a are explained.

In the embodiment shown in FIG. 3, the shunt configuration 10 has two shunt rings 10a, 10b, radially disposed one inside the other. The radially inner shunt ring 10a is electrically and thermally connected to the single-turn coils 9 of the first coil assembly 4a of the secondary coil assembly 4 via jumpers 11, and the radially outer shunt ring 10b is connected to the single-turn coils 9 of the second coil assembly 4b.

Because the two shunt rings 10a, 10b are separated, the two coil sections 4a, 4b of the secondary coil assembly 4 can to some extent be decoupled from each other; in particular, quench processes in the two coil sections 4a, 4b can be separated from each other in time.

As a further special feature, the radially inner, first coil section 2a of the primary coil assembly 2 is axially shortened as compared with the secondary coil assembly 4 and with the second coil section 2b of the primary coil assembly 2 to optimize the magnetic field distribution in the fault current limiter 1. The first coil section 2a therefore has fewer turns 3 than the second coil section 2b.

Figure 4:
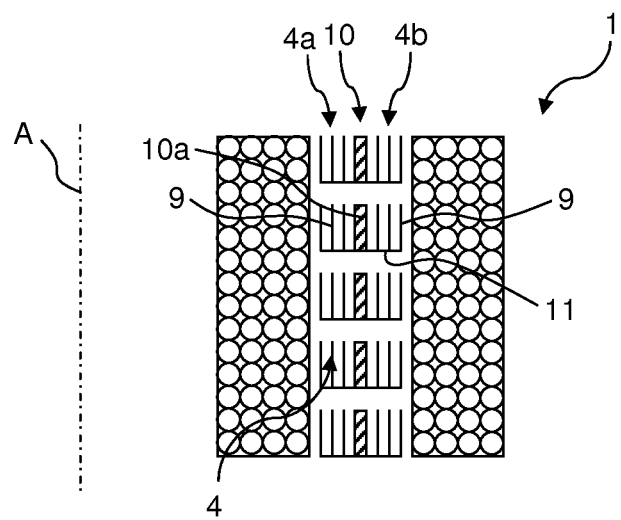
FIG. 4 a schematic sectional view of a fourth embodiment of an inventive fault current limiter, with a secondary coil assembly comprising a radially inner and a radially outer coil section, between which a shunt configuration is disposed, wherein the secondary coil assembly is divided in the axial direction.

FIG. 4 shows a fourth embodiment of an inventive fault current limiter 1. Again, only the essential differences from the embodiment in FIG. 2a are explained.

In this embodiment, the coil sections 4a, 4b of the secondary coil assembly 4 and the shunt configuration 10 are divided into multiple axial levels (five levels in this case), cf. the vertical axis A. In each level, one shunt ring 10a, three single-turn coils 9 for the inner coil section 4a, three single-turn coils 9 for the outer coil section 4b, and a jumper 11 are provided.

Due to the axial subdivision, even in axially extending fault current limiters (for example, in the axial height range 1 to 2 m or more), strip-shaped superconductors with usual conductor widths (usually 1 cm to 4 cm, in the axial direction) can be used; in practice, usually ten or more, often also forty or more levels are provided.

Figure 5A:
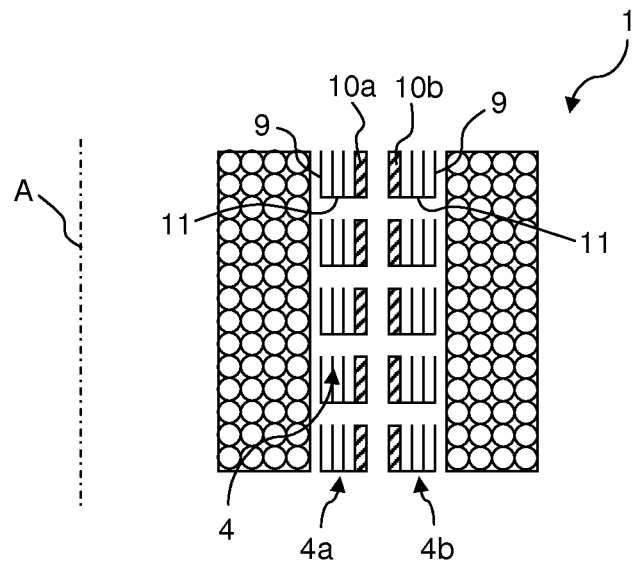
FIG. 5a a schematic sectional view of a fifth embodiment of an inventive fault current limiter, with a secondary coil assembly comprising a radially inner and a radially outer coil section, between which a shunt configuration radially divided into two is disposed, wherein the secondary coil assembly is divided in the axial direction.

As can be seen in the embodiment of the fault current limiter 1 in FIG. 5a, a radial subdivision is also possible within each level. Each of the radially inner single-turn coils 9 of the first coil section 4a of the secondary coil assembly 4 and a radially inner shunt ring 10a are then connected via a jumper 11, and the radially outer single-turn coils 9 of the second coil section 4b and a radially outer shunt ring 10b are also connected to each other via a jumper 11.

Figure 5B:
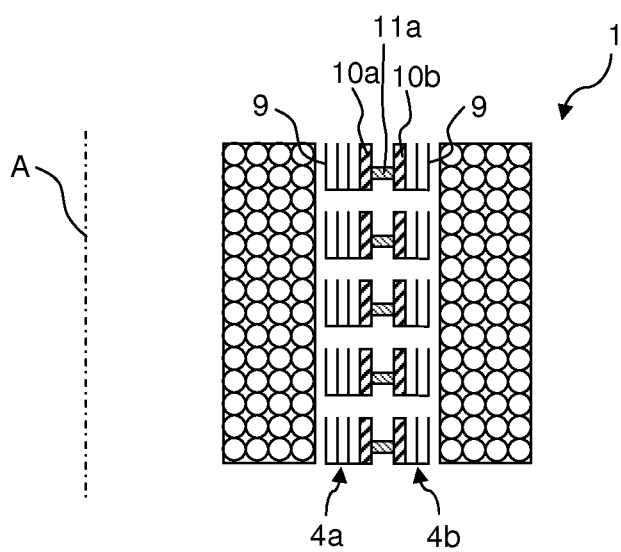
FIG. 5b a schematic sectional view of a variant of the fifth embodiment, with additional jumpers between radially adjacent shunt rings.

In a variant of this embodiment, which is shown in FIG. 5b, the shunt rings 10a, 10b of one level are electrically and, above all, thermally connected to each other via additional jumpers 11*a*. Additional jumpers 11*a*, can be used to set the speed with which a quench propagates in one of the two coil sections 4*a*, 4*b*, due to the current redistribution to the other coil section 4*a*, 4*b* caused by the quench. In the variant shown, moreover, only two single-turn coils 9 per level are provided in the radially outer coil section 4*b* in this case (instead of three in the embodiment in FIG. 5*a*).

Figure 6:
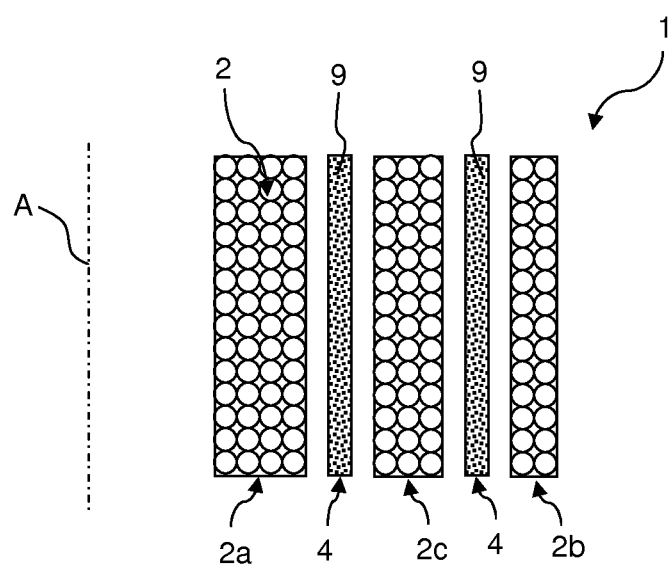
FIG. 6 a schematic sectional view of a sixth embodiment of an inventive fault current limiter, wherein the primary coil assembly has three radially spaced coil sections, between which two secondary coil assemblies are disposed.

FIG. 6 shows an embodiment of an inventive fault current limiter 1, in which the primary coil assembly 2 has three coil sections 2*a*, 2*b*, 2*c* in total. One superconducting, short-circuited secondary coil section 4 is disposed between the radially innermost coil section 2*a* and the radially central coil section 2*c* and one between the central coil section 2*c* and the radially outer coil section 2*b*. The secondary coil sections 4 are each shown with a single-turn coil 9 in this case; alternatively, they can also be constituted as shown in FIGS. 2*a* to 5*b*.

Also note that the coil sections 2*a*, 2*b*, 2*c* of the primary coil assembly 2 each have a different number of turn layers (here four, three, and two), wherein the number of turn layers decreases radially outwardly in each coil section 2*a*, 2*b*, 2*c*. In practice, according to the invention, thirty or more, often sixty or more turn layers per coil section of the primary coil assembly are generally provided, and the coil sections of the primary coil assembly (or their turn layers) have a considerable radial thickness, usually 6 cm and more, often 15 cm and more.

The inventive inductive fault current limiter can be used to limit or prevent a current rise in a protected alternating current carrying electric conductor during operational faults (for example, short circuits). The electric conductor can, in particular, be part of a public electricity supply network or be located in a transformer substation.

We claim:

1. An inductive fault current limiter, comprising:
   a superconducting, short-circuited secondary coil assembly; and
   a normally conducting primary coil assembly having a multiplicity of turns, wherein said primary coil assembly and said secondary coil assembly are disposed substantially coaxially with respect to each other and partially interleaved in each other, said primary coil assembly having a first coil section and a second coil section, with turns of said first coil section being disposed radially inside said secondary coil assembly and turns of said second coil section being disposed radially outside said secondary coil assembly, wherein said secondary coil assembly comprises a first coil section and a second coil section, said first coil section of said secondary coil assembly being disposed radially inside said second coil section of said secondary coil assembly and further comprising a normally conducting shunt configuration disposed radially between said first coil section of said secondary coil assembly and said second coil section of said secondary coil assembly, wherein said shunt configuration has one or more closed shunt rings disposed radially between said first coil section of said secondary coil assembly and said second coil section of said secondary coil assembly.

2. The fault current limiter of claim 1, wherein said secondary coil assembly is disposed centrally between an innermost turn layer of said first coil section of said primary coil assembly and an outermost turn layer of said second coil section of said primary coil assembly.

3. The fault current limiter of claim 1, wherein said turns of said primary coil assembly are distributed substantially evenly between said first coil section and said second coil section of said primary coil assembly.

4. The fault current limiter of claim 1, wherein said secondary coil assembly comprises one or more superconducting, ring-shaped closed single-turn coils.

5. The fault current limiter of claim 1, wherein said shunt configuration has two shunt rings disposed interleaved in each other, wherein a radially inner shunt ring is electrically conductively connected to said first coil section of said secondary coil assembly and a radially outer shunt ring is electrically conductively connected to said second coil section of said secondary coil assembly.

6. The fault current limiter of claim 1, wherein said primary coil assembly and said secondary coil assembly are constructed substantially rotationally symmetrically with respect to an axis or with respect to a vertical axis.

7. The fault current limiter of claim 1, further comprising a ferromagnetic core disposed radially inside said first coil section of said primary coil assembly.

8. The fault current limiter of claim 1, wherein said secondary coil assembly extends at least a same distance in an axial direction as said primary coil assembly.

9. The fault current limiter of claim 1, wherein said first and second coil sections of said primary coil assembly extend different distances in an axial direction.

10. The fault current limiter of claim 1, wherein said secondary coil assembly is made of a high-temperature superconducting material, of YBCO or of BSCCO.

11. The fault current limiter of claim 1, further comprising a cryostat in which said secondary coil assembly is disposed, said secondary coil assembly, said first and said second coil sections of said primary coil assembly and said cryostat being positioned and dimensioned such that, for interstices ZR in a radial direction between mutually opposite sides of said secondary coil assembly and said first and said second coil sections of said primary coil assembly, $ZR < 1/2 D_{PS} + 1/2 D_S$ or $ZR < 1/2 D_{PS}$,
   where $D_{PS}$: thickness of said first or said second coil section of said primary coil assembly in said radial direction which limits an associated said interstice ZR and $D_S$: thickness of said secondary coil assembly in said radial direction which limits an associated said interstice ZR.

12. The fault current limiter of claim 1, wherein said primary coil assembly has N, N=3 or N=4 coil sections, where N ∈IN and N≤3, the fault current limiter having N−1 secondary coil assemblies, wherein each secondary coil assembly is disposed radially between two coil sections of said primary coil assembly.

13. An inductive fault current limiter, comprising:
   a superconducting, short-circuited secondary coil assembly; and
   a normally conducting primary coil assembly having a multiplicity of turns, wherein said primary coil assembly and said secondary coil assembly are disposed substantially coaxially with respect to each other and partially interleaved in each other, said primary coil assembly having a first coil section and a second coil section, with turns of said first coil section being disposed radially inside said secondary coil assembly and turns of said second coil section being disposed radially outside said secondary coil assembly, wherein said secondary coil assembly comprises a first coil section and a second coil section, said first coil section of said secondary coil assembly being disposed radially inside said second coil section of said secondary coil assembly and further comprising a normally conducting shunt configuration disposed radially between said first coil section of said secondary coil assembly and said second coil section of said secondary coil assembly, wherein said shunt configuration has a multiplicity of metallic jumpers, which electrically conductively connect said shunt configuration to said first and/or said second coil section of said secondary coil assembly.

14. An inductive fault current limiter, comprising:

a superconducting, short-circuited secondary coil assembly; and a normally conducting primary coil assembly having a multiplicity of turns, wherein said primary coil assembly and said secondary coil assembly are disposed substantially coaxially with respect to each other and partially interleaved in each other, said primary coil assembly having a first coil section and a second coil section, with turns of said first coil section being disposed radially inside said secondary coil assembly and turns of said second coil section being disposed radially outside said secondary coil assembly, wherein said secondary coil assembly comprises a first coil section and a second coil section, said first coil section of said secondary coil assembly being disposed radially inside said second coil section of said secondary coil assembly and further comprising a normally conducting shunt configuration disposed radially between said first coil section of said secondary coil assembly and said second coil section of said secondary coil assembly, wherein said first and said second coil section of said secondary coil assembly have a different number of superconducting, ring-shaped closed single-turn coils.

\* \* \* \* \*